US010059370B2

(12) United States Patent
Min (10) Patent No.: US 10,059,370 B2
(45) Date of Patent: Aug. 28, 2018

(54) ELECTRONIC POWER STEERING DEVICE AND METHOD FOR REDUCING TORQUE RISE IN LOW-TEMPERATURE SITUATION OF ELECTRONIC POWER STEERING DEVICE

(71) Applicant: MANDO CORPORATION, Pyeongtaek-si, Gyeonggi-do (KR)

(72) Inventor: Seung Gi Min, Suwon-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/408,094

(22) Filed: Jan. 17, 2017

(65) Prior Publication Data

US 2017/0203786 A1    Jul. 20, 2017

(30) Foreign Application Priority Data

Jan. 20, 2016  (KR) ........................ 10-2016-0007289

(51) Int. Cl.
*B62D 5/04* (2006.01)
*B62D 6/10* (2006.01)
*B62D 15/02* (2006.01)

(52) U.S. Cl.
CPC ......... *B62D 5/0496* (2013.01); *B62D 5/0463* (2013.01); *B62D 6/10* (2013.01); *B62D 15/021* (2013.01)

(58) Field of Classification Search
CPC .. B62D 5/0496; B62D 5/0463; B62D 15/021; B62D 6/10
See application file for complete search history.

(56) References Cited

U.S. PATENT DOCUMENTS 8,977,436 B2 * 3/2015 Endo et al. .......... B62D 5/0463
701/42

* cited by examiner

*Primary Examiner* — Dale W Hilgendorf
(74) *Attorney, Agent, or Firm* — McDermott Will & Emery LLP

(57) ABSTRACT

The present embodiments relate to an electronic power steering device, and relates to a technology for reducing a torque rise resulting from an increase in frictional force in a low-temperature situation of the electronic power steering device. According to the present embodiments, a viscous friction compensation current is calculated using a viscous gain, which has been determined according to a damping coefficient estimated from a temperature sensed in a low-temperature situation of the electronic power steering device, and a steering angular velocity, a Coulomb friction compensation current is calculated using the sensed temperature and the mount of accumulated steering angles, and the calculated viscous friction compensation current and the Coulomb friction compensation current are added to the motor driving current and then supplied such that the driver can have the same feeling of driving, even in the low-temperature situation, as that in the room-temperature situation.

17 Claims, 8 Drawing Sheets

ELECTRONIC POWER STEERING DEVICE AND METHOD FOR REDUCING TORQUE RISE IN LOW-TEMPERATURE SITUATION OF ELECTRONIC POWER STEERING DEVICE

CROSS-REFERENCE TO RELATED APPLICATION

This application claims priority from Korean Patent Application No. 10-2016-0007289, filed on Jan. 20, 2016, which is hereby incorporated by reference for all purposes as if fully set forth herein.

BACKGROUND OF THE INVENTION

1. Field of the Invention

The present embodiments relate to an EPS (Electronic Power Steering) device.

2. Description of the Prior Art

Steering devices of automobiles include hydraulic steering devices, which use hydraulic pumps, and EPS devices, which use motors, and the EPS devices tend to become widespread since the 1990s.

In the case of a hydraulic steering device, the engine drives the hydraulic pump, which provides steering assist power, so that energy is always consumed regardless of whether the steering wheel is rotated or not; in the case of an EPS device, in contrast, when a rotational torque (steering torque) is generated by rotating the steering wheel, the motor supplies steering assist power in proportion to the generated steering torque. Therefore, use of an EPS device is advantageous in that, compared with the case of using a hydraulic steering device, the energy efficiency can be improved.

The EPS device is configured such that a steering torque, which is generated by rotating the steering wheel, is transferred to the rack bar via a rack-pinion mechanism unit, and steering assist power, which is generated by the motor according to the generated steering torque, is transferred to the rack bar. That is, the steering torque, which is generated by the steering wheel, and the steering assist power, which is generated by the motor, are combined and cause the rack bar to move in the axial direction.

When the EPS device conducts steering in a low-temperature situation, on the other hand, the increase in friction or viscosity requires a larger steering force than in a room-temperature situation.

For example, when a car that has been left in a low-temperature situation (for example, in winter) for a long time is started and initially steered, a larger steering force is needed than when steering is conducted in a normal state (room temperature). Therefore, the EPS device requires a means for generating power that assists the steering force according to the temperature.

SUMMARY OF THE INVENTION

An aspect of the present embodiments is to provide, in order to solve the above-mentioned problems, an EPS device configured to calculate a compensation current, which can reduce a torque rise resulting from a frictional force in a low-temperature situation of the EPS device, and to supply the compensation current to the motor such that the driver can have the same feeling of steering, even at a low temperature, as that at room temperature.

Another aspect of the present embodiments is to provide an EPS device configured to divide a frictional force in a low-temperature situation into a viscous frictional force and a Coulomb frictional force, to calculate a compensation current with regard to each frictional force, and to apply the same such that a torque rise, which results from the low-temperature frictional force, can be reduced effectively.

An embodiment provides an electronic power steering device including: a viscous friction compensation current calculation unit configured to determine a viscous gain on the basis of a temperature sensed by a temperature sensor and to calculate a first compensation current using the determined viscous gain and a steering angular velocity; a Coulomb friction compensation current calculation unit configured to determine a temperature gain on the basis of the sensed temperature, to determine a steering angle gain on the basis of an amount of accumulated steering angles, and to calculate a second compensation current using the temperature gain and the steering angle gain; and a compensation current output unit configured to output a friction compensation current on the basis of the first compensation current and the second compensation current.

In connection with the electronic power steering device, the viscous friction compensation current calculation unit may determine the viscous gain according to the sensed temperature using a lookup table, which stores information regarding the relation between the temperature and the viscous gain, and the viscous gain may decrease as the sensed temperature increases, i.e. have an inversely proportional relationship.

In addition, the viscous friction compensation current calculation unit may estimate a damping coefficient on the basis of the sensed temperature and may determine a viscous gain according to the estimated damping coefficient; and, in this case, a lookup table, which stores information regarding the relation between the temperature and the damping coefficient, may be used to estimate the damping coefficient according to the sensed temperature.

In connection with the electronic power steering device, the Coulomb friction compensation current calculation unit may give a weight to the steering torque using the determined temperature gain and the determined steering angle gain and may output a compensation current regarding the given weight as a second compensation current.

Another embodiment provides a method for reducing a torque rise in a low-temperature situation of an electronic power steering device, the method including: sensing a temperature of a system; determining a viscous gain on the basis of the sensed temperature and calculating a first compensation current using the determined viscous gain and a steering angular velocity; determining a temperature gain according to the sensed temperature, determining a steering angle gain according to an amount of accumulated steering angles, and calculating a second compensation current using the temperature gain and the steering angle gain; and outputting a friction compensation current on the basis of the first compensation current and the second compensation current.

The present embodiments advantageously provide an EPS device and a method for reducing a torque rise in a low-temperature situation of the EPS device, wherein compensation currents are calculated according to the viscous frictional force and the Coulomb frictional force in a low-temperature situation of the EPS device, the calculated compensation currents are applied, and the motor is driven accordingly such that the driver can have the same feeling of steering, even in a low-temperature situation, as that at room temperature.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, some embodiments of the present invention will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These tennis are merely used to distinguish one component from other components, and the property, order, sequence and the like of the corresponding component are not limited by the corresponding term. In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 to FIG. 4 are diagrams illustrating an increase of frictional force in a low-temperature situation of an EPS device according to the present embodiments.

Figure 1:
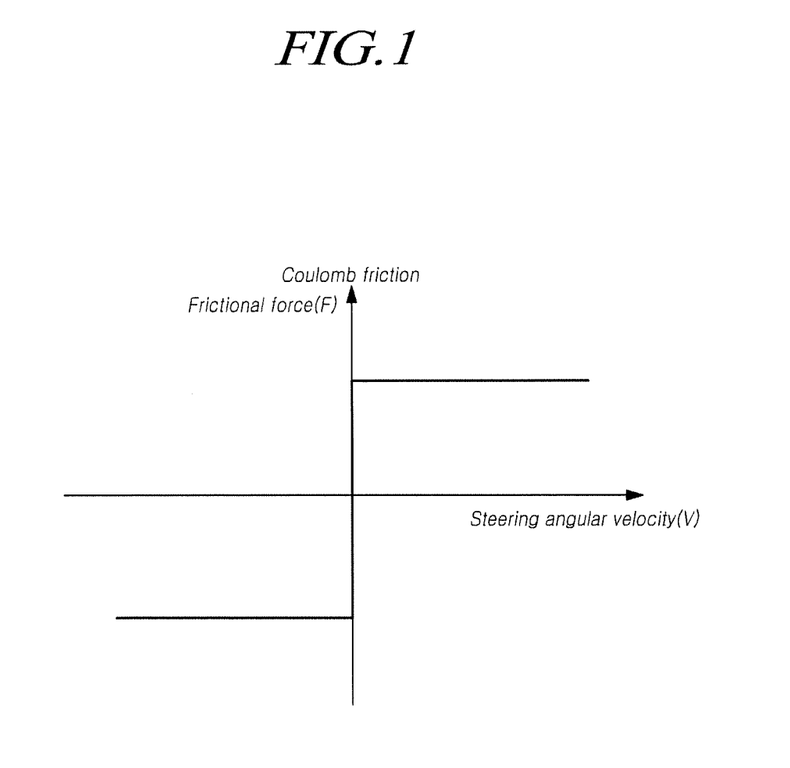
FIG. 1 to FIG. 4 are diagrams illustrating an increase of frictional force in a low-temperature situation of an EPS device according to the present embodiments.
Figure 2:
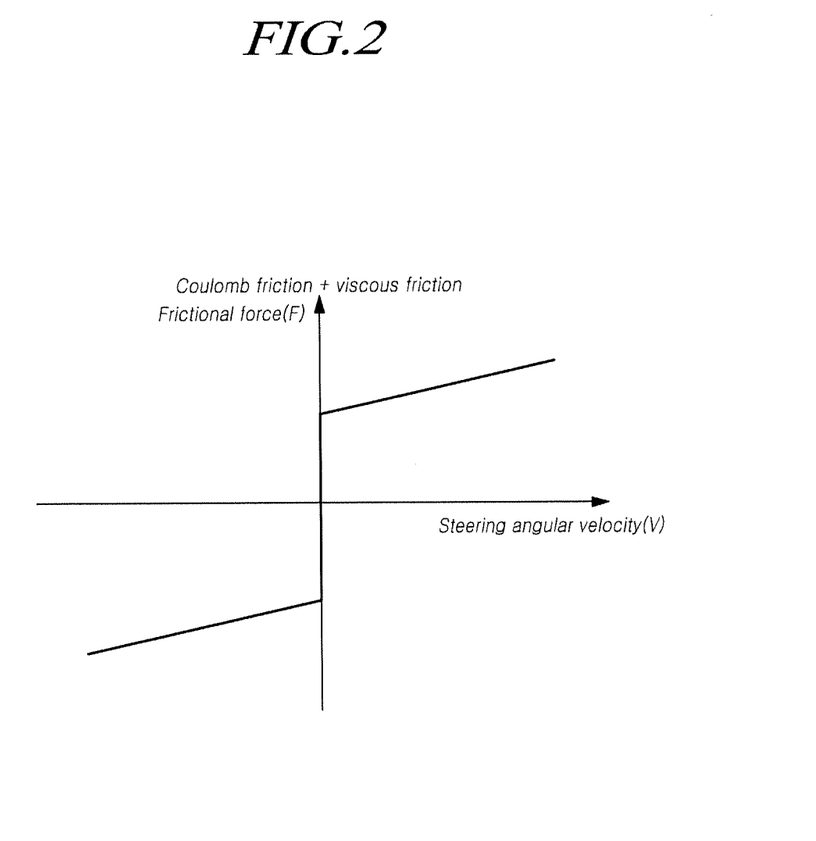
Figure 3:
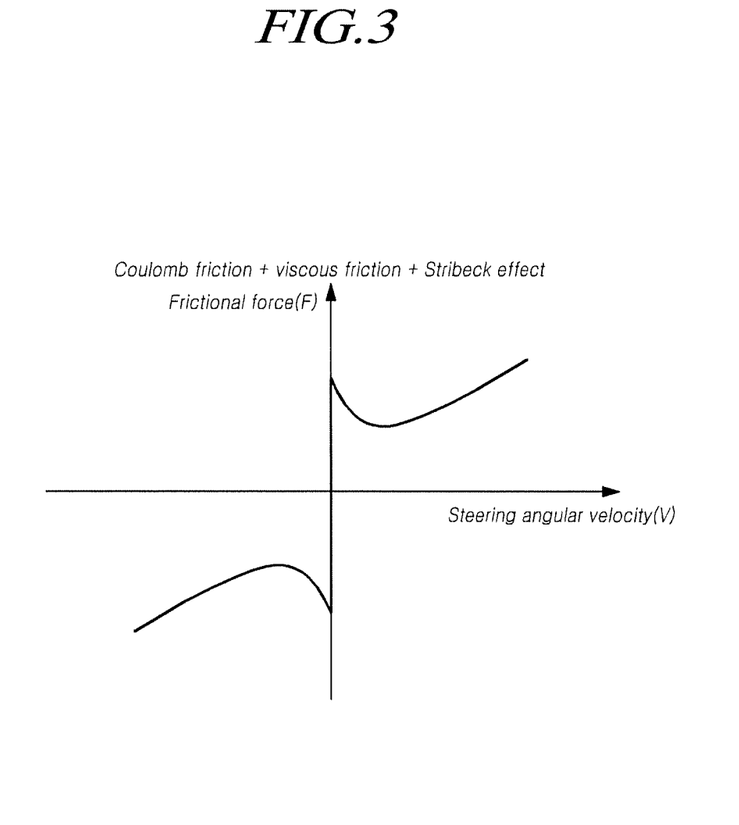
Figure 4:
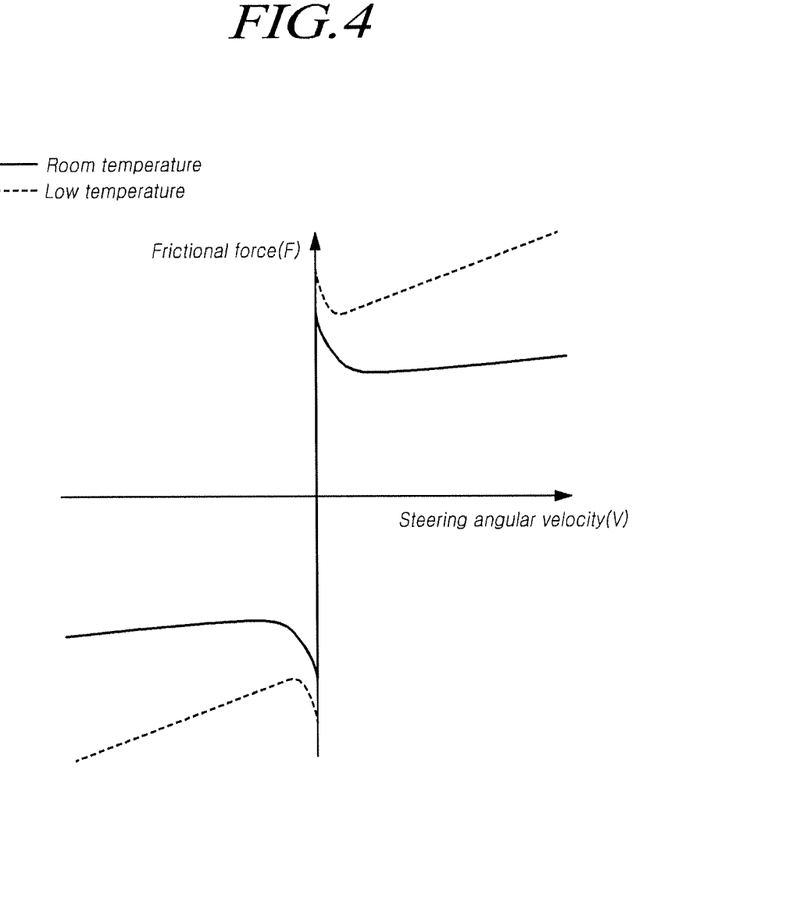

FIG. 1 illustrates a change in frictional force influenced by a Coulomb frictional force resulting from a steering angular velocity in a low-temperature state; FIG. 2 illustrates a change in frictional force influenced by the Coulomb frictional force resulting from a steering angular velocity in a low-temperature state and by a viscous frictional force; FIG. 3 illustrates a change in frictional force, to which the Stribeck effect has been applied; and FIG. 4 illustrates a comparison between a change in friction force resulting from a steering angular velocity in a room-temperature state and that in a low-temperature state.

The frictional force that increases in a low-temperature state of an EPS device can be divided into a "Coulomb frictional force" and a "viscous frictional force".

The Coulomb frictional force refers to a frictional force that occurs constantly when a steering angular velocity exists in a low-temperature state of the EPS device, regardless of the magnitude of the steering angular velocity. In other words, the Coulomb frictional force corresponds to a predetermined magnitude of frictional force, which is added to the frictional force in a room-temperature state, in the low-temperature state of the EPS device.

The viscous frictional force refers to a frictional force generated in proportion to the magnitude of the steering angular velocity in a low-temperature state of the EPS device. Since the viscous frictional force increases in proportion to the magnitude of the steering angular velocity, a frictional force, the magnitude of which is in proportion to the magnitude of the steering angular velocity, is added, in a low-temperature situation of the EPS device, to the frictional force in a room-temperature state.

The frictional force that occurs in a low-temperature state of the EPS device will now be described in detail with reference to FIG. 1 to FIG. 4.

It is clear from FIG. 1 that, in a low-temperature state of the EPS device, a frictional force (Coulomb frictional force) exists that is generated in a predetermined size as the steering angular velocity increases.

The Coulomb frictional force refers to a frictional force that is generated in a predetermined magnitude when the steering angular velocity increases; a predetermined value of Coulomb frictional force occurs when a steering angular velocity exists, regardless of the magnitude of the steering angular velocity.

Particularly, the Coulomb frictional force refers to a predetermined magnitude of frictional force that is added to the magnitude of the frictional force in a room-temperature state of the EPS device, and corresponds to a value of parallel movement, in the direction of the frictional force, of the graph that illustrates the relation between the steering angular velocity and the frictional force in the room-temperature state of the EPS device.

In order to compensate for the torque rise resulting from the Coulomb frictional force, therefore, it is necessary to calculate and apply a compensation current that corresponds to a parallel movement, in the opposite direction, of the graph, which illustrates the relation between the steering angular velocity and the frictional force, and which has undergone a parallel movement.

FIG. 2 illustrates a change in frictional force, which corresponds to the sum of the Coulomb frictional force described with reference to FIG. 1 and a viscous frictional force.

It is clear from FIG. 2 that there exists a frictional force that increases gradually as the steering angular velocity increases in a low-temperature state of the EPS device.

Particularly, in a low-temperature state of the EPS device, there occurs a frictional force that increases in proportion to the steering angular velocity, in addition to the Coulomb frictional force that occurs in a predetermined magnitude regardless of the magnitude of the steering angular velocity.

In order to compensate for the torque rise resulting from the viscous frictional force, therefore, it is necessary to calculate and apply a compensation current that can compensate for the frictional force that is proportional to the magnitude of the steering angular velocity.

FIG. 3 illustrates a graph obtained by applying the Stribeck effect, which is the effect caused by a static frictional force, to the graph illustrated in FIG. 2, which illustrates a change in frictional force resulting from the Coulomb frictional force and the viscous frictional force in a low-temperature state of the EPS device.

Therefore, a change in frictional force resulting from a change in steering angular velocity in a low-temperature state of the EPS device is as illustrated in the graph of FIG. 3.

FIG. 4 illustrates a comparison between the graph illustrated in FIG. 3, which illustrates the relation between the steering angular velocity and the frictional force in a low-temperature state of the EPS device, and a graph in a room-temperature state.

It is clear from FIG. 4 that the graph (dotted lines) illustrating the relation between the steering angular velocity and the frictional force in a low-temperature state has a frictional force formed to be larger than that of the graph (solid lines) illustrating the relation between the steering angular velocity and the frictional force in a room-temperature state of the EPS device, and also has a different graph shape.

Given that the frictional force is larger in the low-temperature state than in the room-temperature state of the EPS device, therefore, a compensation current control, which can reduce the torque rise resulting from the increased frictional force, is necessary to enable the driver to have the same feeling of steering, in the low-temperature state, as that in the room-temperature state.

Furthermore, given that the viscous frictional force occurs in proportion to the steering angular velocity, and may have an inclination formed differently depending on the temperature, a compensation current control, which can effectively reduce the torque rise resulting from the viscous frictional force, is required.

Figure 5:
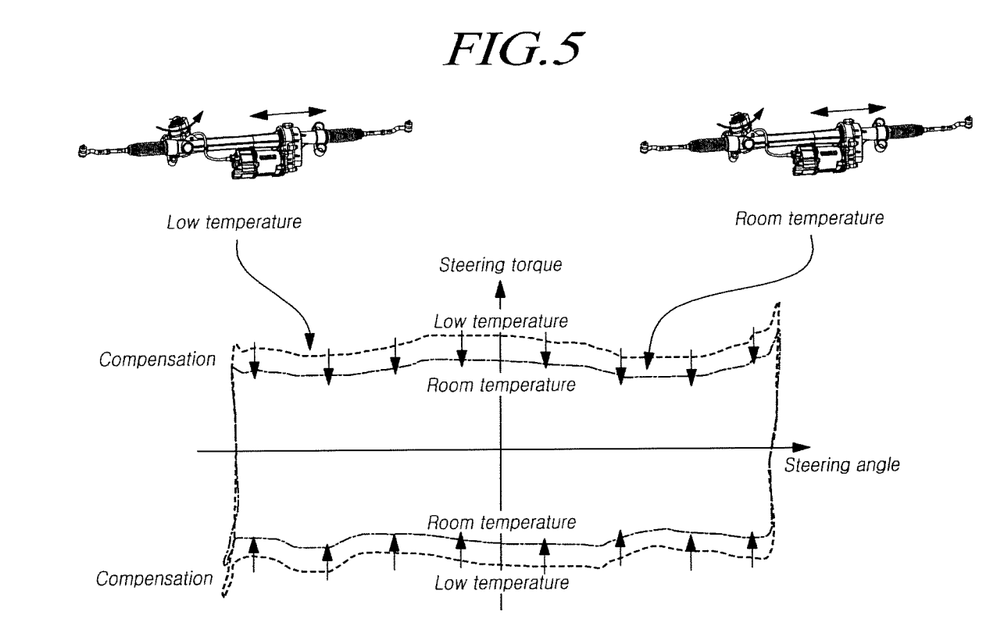
FIG. 5 is a diagram illustrating a concept of compensating for a torque rise in a low-temperature situation of an EPS device according to the present embodiments.

FIG. 5 is a diagram illustrating a concept of a scheme for reducing a torque rise in a low-temperature situation of an EPS device according to the present embodiments.

Referring to FIG. 5, the EPS device according to the present embodiments is characterized in that the same calculates and applies a compensation value such that the steering torque, which has increased in a low-temperature state, has the same value as the steering torque in a room-temperature state, and, as the compensation value, a compensation value regarding a Coulomb frictional force and a compensation value regarding a viscous frictional force are calculated and applied.

Figure 6:
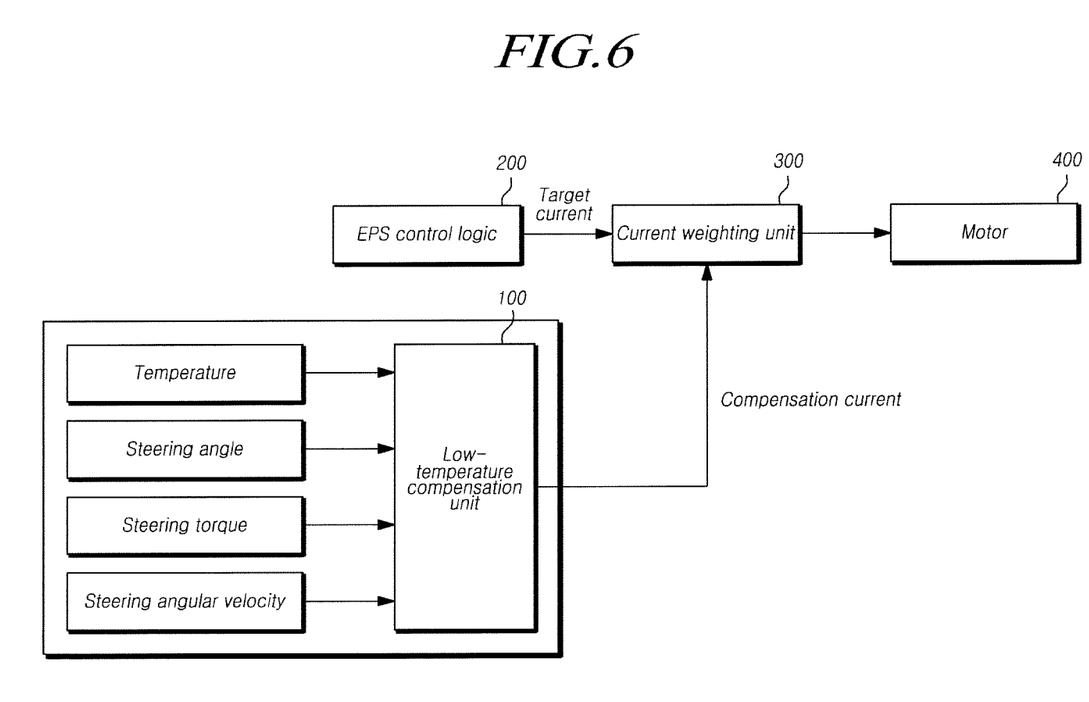
FIG. 6 is a block diagram illustrating a schematic configuration of an EPS device according to the present embodiments.
Figure 7:
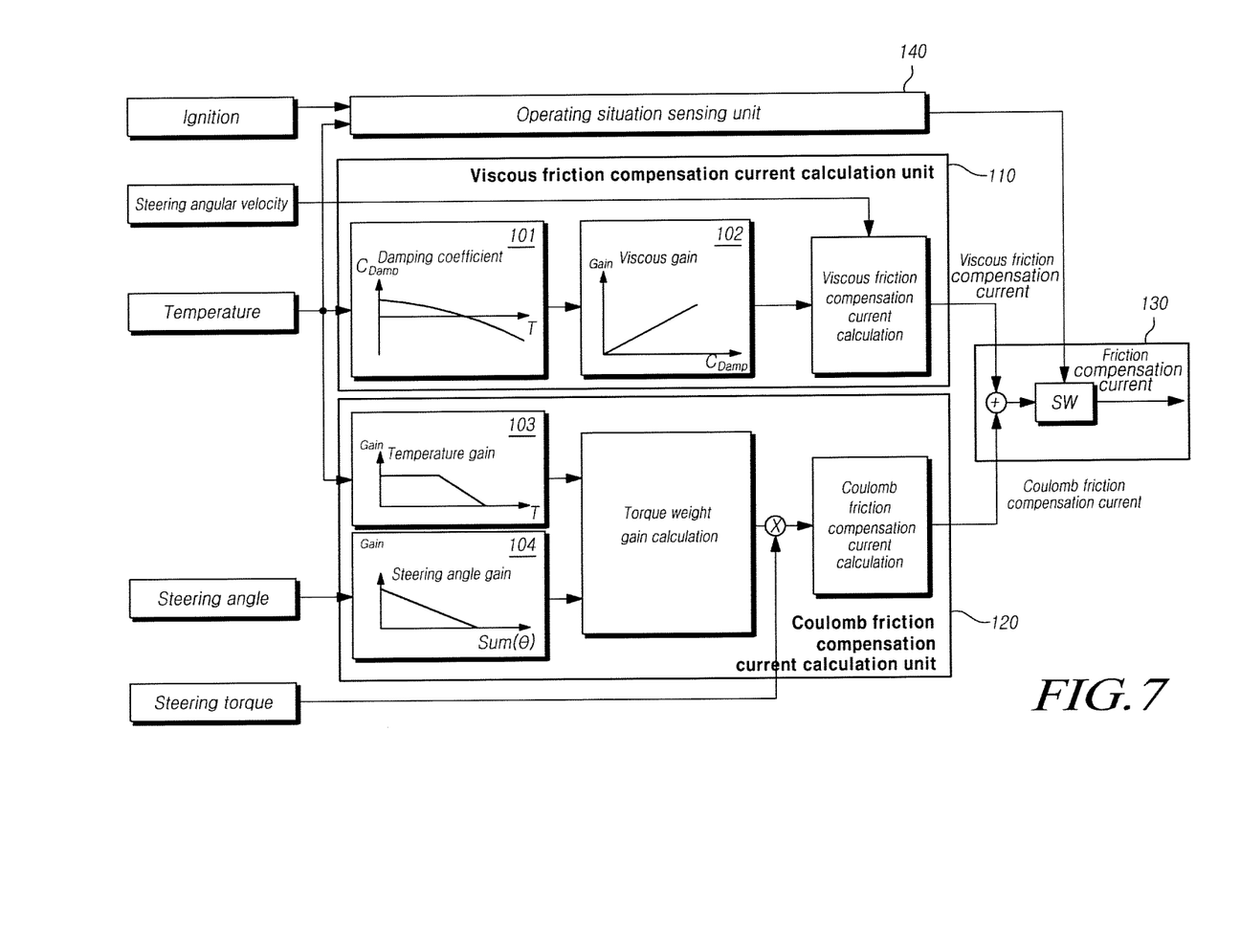
FIG. 7 is a block diagram illustrating a detailed configuration of a low-temperature compensation unit of an EPS device according to the present embodiments.

FIG. 6 illustrates a schematic configuration of an EPS device according to the present embodiments, and FIG. 7 illustrates a detailed configuration of the EPS device according to the present embodiments.

Referring to FIG. 6, the EPS device according to the present embodiments may include a low-temperature compensation unit 100, an EPS control logic 200, a current weighting unit 300, and a motor 400, and the present embodiments are characterized by including the low-temperature compensation unit 100.

The EPS control logic 200 calculates a current (target current) for driving the motor 400 according to the steering torque generated by rotating the steering wheel, and supplies the calculated current to the motor 400, thereby controlling the driving of the motor 400.

The EPS device according to the present embodiments includes a low-temperature compensation unit 100 and a current weighting unit 300 such that the current weighting unit 300 adds a compensation current, which is output by the low-temperature compensation unit 100, to a driving current (target current), which is output by the EPS control logit 200, and supplies the resulting current to the motor 400, thereby guaranteeing that a current, to which a compensation current depending on the low-temperature state has been applied, can be supplied to the motor 400.

Therefore, according to the present embodiments, the EPS device supplies a driving current to the motor 400 after applying a compensation current depending on the low-temperature state, thereby enabling the driver to have the same feeling of steering, even in the low-temperature state, as that in the room-temperature state.

The low-temperature compensation unit 100 calculates a compensation current on the basis of the temperature, the steering angle, the steering torque, and the steering angular velocity, and outputs the calculated compensation current. Processes of calculating compensation currents regarding the viscous frictional force and the Coulomb frictional force, respectively, on the basis of the above-mentioned information by the low-temperature compensation unit 100 will now be described in detail with reference to FIG. 7.

Referring to FIG. 7, the low-temperature compensation unit 100 according to the present embodiments may include a viscous friction compensation current calculation unit 110, a Coulomb friction compensation current calculation unit 120, a compensation current output unit 130, and an operating situation sensing unit 140.

The viscous friction compensation current calculation unit 110 calculates and outputs a viscous friction compensation current (first compensation current), which is a compensation current depending on the viscous frictional force in the low-temperature state of the EPS device, such that the torque rise resulting from the viscous frictional force can be reduced.

The viscous friction compensation current calculation unit 110 receives a temperature, which has been sensed by a temperature sensor, and a steering angular velocity, which has been sensed by a steering angular velocity sensor.

The sensed temperature and the steering angular velocity are used to calculate a viscous friction compensation current, and the process of calculating the viscous friction compensation current includes a process of estimating a damping coefficient $C_{Damp}$ on the basis of the sensed temperature and determining a viscous gain according to the estimated damping coefficient $C_{Damp}$.

When the sensed temperature is received, the viscous friction compensation calculation unit 110 estimates the damping coefficient $C_{Damp}$ on the basis of the sensed temperature.

In general, the steering torque applied to the steering wheel can be expressed using a second-order differential equation as in equation (1) below:

$$F = m\ddot{x} + c\dot{x} + k$$

wherein F=steering torque (Nm), x=steering angle (deg), $\dot{x}$=steering angular velocity (deg/s), $\ddot{x}$=steering angular acceleration (deg/s$^2$), m=mass, and k=torsion bar constant.

In the present specification, the damping coefficient $C_{Damp}$ refers to the steering angular velocity item in equation (1) above, i.e. the coefficient of $\dot{x}$, c.

Particularly, damping coefficient $C_{Damp}$, as used herein, indicates the influence of the steering angular velocity on the steering torque F; in equation (1), the lower the temperature is, the larger c becomes; for this reason, even if steering is conducted at the same angular velocity at room and low temperatures, respectively, a larger steering torque F is necessary at the low temperature; and, in order to compensate for the same, the present invention uses the viscous friction compensation current.

The damping coefficient $C_{Damp}$ can be estimated using a lookup table LUT that stores the relation between the temperature and the damping coefficient $C_{Damp}$, and, as illustrated in 101, the damping coefficient $C_{Damp}$ has a value that decreases as the temperature increases.

Particularly, the lower the temperature is, the larger the damping coefficient $C_{Damp}$ becomes, and, the higher the temperature is, the smaller the damping coefficient $C_{Damp}$ becomes; therefore, the viscous friction compensation current calculation unit 110 may output a value of the viscous friction compensation current, which is smaller than zero, when the damping coefficient $C_{Damp}$ is larger than zero, and may output a value of the viscous friction compensation current, which is larger than zero, when the damping coefficient $C_{Damp}$ is smaller than zero.

When the damping coefficient $C_{Damp}$ is estimated on the basis of the sensed temperature, the viscous friction compensation current calculation unit 110 determines a viscous gain according to the estimated damping coefficient $C_{Damp}$.

The relation between the damping coefficient $C_{Damp}$ and the damping gain may be as illustrated in 102. Particularly, the viscous gain may linearly increase in proportion to the damping coefficient $C_{Damp}$. However, the linear increase of the viscous gain in proportion to the damping coefficient $C_{Damp}$ is only an example, and is not limiting in any manner; and, given that the lower the temperature is, the larger the damping coefficient $C_{Damp}$ becomes, the viscous gain needs only to increase as the damping coefficient $C_{Damp}$ increases.

Therefore, according to another embodiment, the viscous gain may be determined according to the sensed temperature. Particularly, the higher the sensed temperature is, the smaller the viscous gain may be set, and the lower the sensed temperature is, the larger the viscous gain may be set.

In other words, the viscous gain may be directly determined from the sensed temperature, without using the damping coefficient, and it is possible to use a lookup table LUT, to this end, which stores the relation between the temperature and the viscous gain.

In this case, the viscous gain may have such a relation that the same decreases as the sensed temperature increases, i.e. inversely proportional to the temperature, and the viscous friction compensation current, which is added to the normal steering assist current, accordingly increases as the low-temperature state becomes closer.

The viscous friction compensation current calculation unit 110 calculates a viscous friction compensation current using the viscous gain, which has been determined according to the sensed temperature or the damping coefficient $C_{Damp}$ estimated therefrom, and the steering angular velocity.

Particularly, the viscous friction force occurs in proportion to the magnitude of the steering angular velocity, and the inclination of the viscous frictional force varies depending on the temperature; therefore, the viscous friction compensation current, which compensates for the viscous frictional force, can be calculated using the viscous gain, which has been determined with reference to the sensed temperature, and the steering angular velocity.

For example, the viscous frictional force, which increases in proportion to the steering angular velocity, may be compensated for by applying a compensation current, the magnitude of which increases in proportion to the magnitude of the steering angular velocity. In this case, the rate of increase of the viscous frictional force may differ depending on the temperature, and, for this reason, the compensation current is calculated by applying the viscous gain, which has been determined according to the sensed temperature or the damping coefficient $C_{Damp}$ estimated therefrom, to the steering angular velocity.

The viscous friction compensation current calculation unit 110 transfers the viscous friction compensation current, which has been calculated using the viscous gain and the steering angular velocity, to the compensation current output unit 130.

The Coulomb friction compensation current calculation unit 120 calculates and outputs a Coulomb friction compensation current (second compensation current), which can reduce the torque rise resulting from the Coulomb frictional force. The Coulomb friction compensation current calculation unit 120 calculates a torque weight according to the sensed temperature and the amount of accumulated steering angles and calculates a Coulomb friction compensation current according to the calculated torque weight.

The Coulomb friction compensation current calculation unit 120 receives information regarding the temperature, which has been sensed by the temperature sensor, and the amount of steering angles accumulated over time.

A temperature gain is determined according to the sensed temperature, a steering angle gain is determined according to the amount of accumulated steering angles, and a torque weight is calculated using the determined temperature gain and the steering angle gain.

The temperature gain is determined according to the sensed temperature and has a constant value at a specific temperature or lower, as illustrated in 103; and, as the sensed temperature becomes higher than the specific temperature, the temperature gain may have a value that decreases gradually.

This is because the Coulomb frictional force occurs in a low-temperature state, and the deviation of temperature in the low-temperature state does not generate a large deviation of the Coulomb frictional force.

The steering angle gain is determined according to the amount of accumulated steering angles, and, as illustrated in 104, may have a value that decreases gradually as the amount of accumulated steering angles increases.

This is because the frictional force decreases gradually as the amount of accumulated steering angles increases, particularly, when the amount of accumulated steering angles increases as the steering wheel is moved after the car is started.

The Coulomb friction compensation current calculation unit 120 calculates a torque weight using the temperature gain, which has been determined according to the sensed temperature, and the steering angle gain, which has been determined according to the amount of accumulated steering angles. In other words, a torque weight is calculated, which is to be given to the steering torque in order to compensate for the Coulomb frictional force.

In addition, the Coulomb friction compensation current calculation unit 120 calculates a compensation current value for applying the given torque weight and outputs the calculated compensation current (Coulomb friction compensation current). For example, when the torque weight following the temperature gain and the steering angle gain is 1N·m, a current value corresponding to 1N·m is calculated, and the same is output as the Coulomb friction compensation current.

The compensation current output unit 130 receives the viscous friction compensation current and the Coulomb friction compensation current from the viscous friction compensation current calculation unit 110 and the Coulomb friction compensation current calculation unit 120, respectively.

The compensation current output unit 130 adds the viscous friction compensation current and the Coulomb friction compensation current and outputs a friction compensation current for reducing the torque rise in the low-temperature state of the EPS steering device. In this case, it is also possible to output the friction compensation current only when the temperature sensed by the temperature sensor is equal to or less than a preset temperature (for example, 25° C.)

Particularly, the friction compensation current may be calculated and output, on the basis of the viscous friction compensation current or the Coulomb friction compensation current, only when the temperature sensed by the temperature sensor is equal to or less than a preset temperature. Alternatively, at least one of the viscous friction compensation current calculation unit 110 and the Coulomb friction compensation current calculation unit 120 may operate only when the temperature is equal to or less than a preset temperature, calculate the viscous friction compensation current or the Coulomb friction compensation current, and provide the same to the compensation current output unit 130.

On the other hand, the low-temperature compensation unit 100 of the EPS device according to the present embodiments may further include an operating situation sensing unit 140.

The operating situation sensing unit 140 determines whether the same is in a low-temperature state or not according to the temperature sensed by the temperature sensor, causes the viscous friction compensation current calculation unit 110 and the Coulomb friction compensation current calculation unit 120 to operate when the same is in a low-temperature state, and controls the compensation current output by the compensation current output unit 130.

Therefore, according to the present embodiments, there is provided an EPS device configured to calculate compensation currents, which can compensate for the torque rise resulting from the Coulomb frictional force and the torque rise resulting from the viscous frictional force in a low-temperature state of the EPS device, respectively, and to apply the calculated compensation currents when a driving current is supplied to the motor 400 such that the driver can have the same feeling of steering, even in the lower-temperature state, as that in the room-temperature state.

Figure 8:
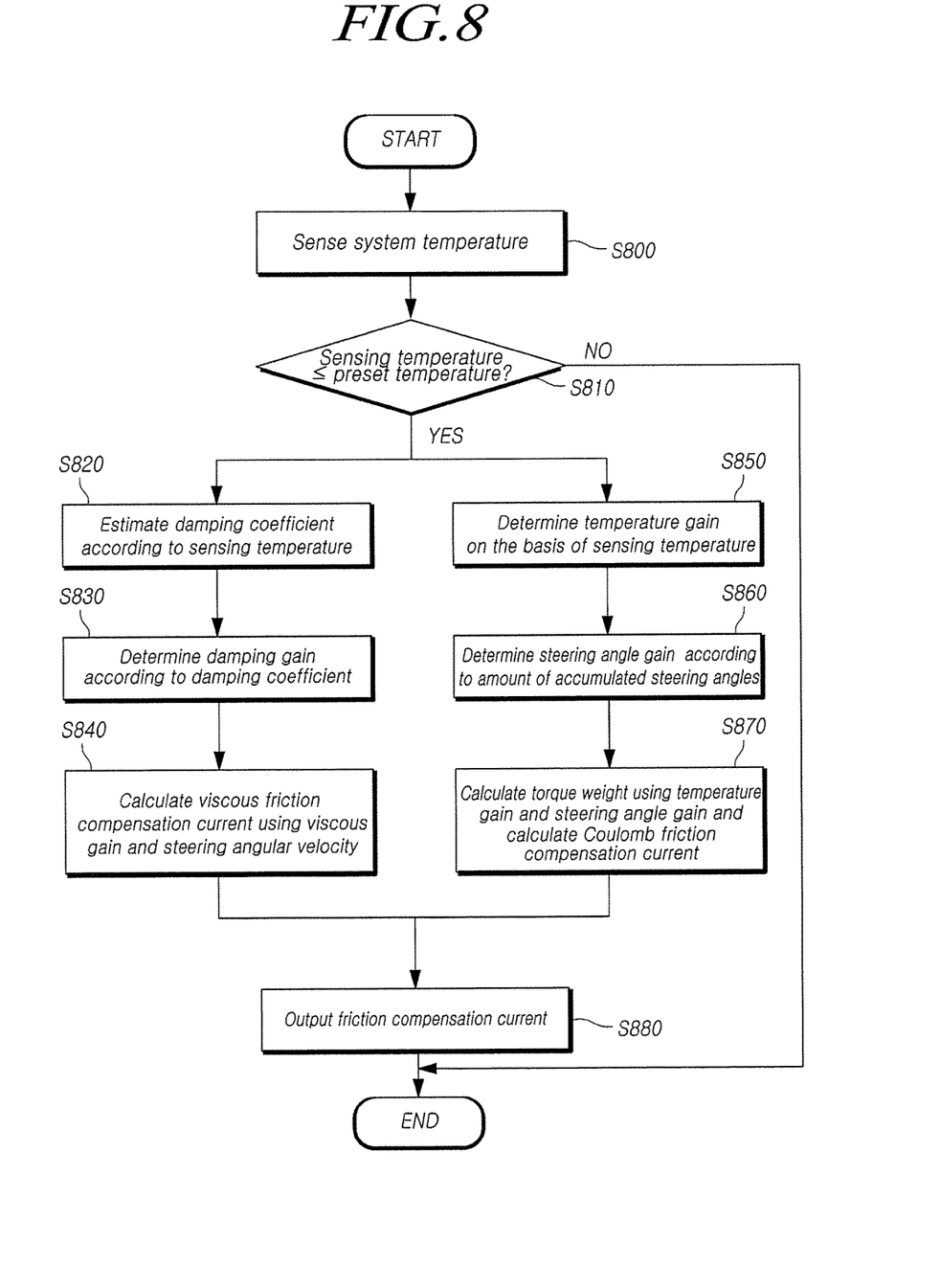
FIG. 8 is a flowchart illustrating processes of a method for reducing a torque rise in a low-temperature situation of an EPS device according to the present embodiments.

FIG. 8 is a flowchart illustrating processes of a method for reducing a torque rise in a low-temperature situation of an EPS device according to the present embodiments.

Referring to FIG. 8, the EPS device according to the present embodiments senses the temperature of the system using a temperature sensor (S800). In this regard, the system may refer to the EPS device, and the temperature may refer to the temperature of the inner system of the car sensed by the temperature sensor.

The EPS device checks whether the sensed temperature is equal to or less than a preset temperature (for example, 25° C.) or not, thereby determining whether the same is in a low-temperature state or not (S810).

When it is determined that the same is in a low-temperature state, the EPS device performs a process of calculating a viscous friction compensation current for compensating for the torque rise resulting from the viscous frictional force and a Coulomb friction compensation current for compensating for the torque rise resulting from the Coulomb frictional force.

In order to calculate the viscous friction compensation current, the EPS device estimates a damping coefficient $C_{Damp}$ on the basis of the sensed temperature (S820).

The damping coefficient $C_{Damp}$ can be estimated using a lookup table LUT, which stores information regarding the relation between the temperature and the damping coefficient $C_{Damp}$, and the damping coefficient $C_{Damp}$ has a value that decreases as the temperature increases.

After the damping coefficient $C_{Damp}$ is estimated, a viscous gain is determined according to the estimated damping coefficient $C_{Damp}$ (S830).

The viscous gain has a value that increases in proportion to the damping coefficient $C_{Damp}$, and, according to another embodiment, the viscous gain may be directly determined from the sensed temperature without using the damping coefficient.

The EPS device calculates a viscous friction compensation current for compensating for the torque rise resulting from the viscous frictional force, using the determined viscous gain and the steering angular velocity (S840).

In order to calculate the Coulomb friction compensation current, the EPS device determines a temperature gain on the basis of the sensed temperature (S850). The temperature gain may have a constant value, when the sensed temperature is equal to or less than a specific temperature, and may have a gradually decreasing value when the specific temperature is exceeded.

The EPS device determines the steering angle gain according to the amount of accumulated steering angles (S860). The steering angle gain may have a value that decreases gradually as the amount of accumulated steering angles increases.

A torque weight, which is to be given to the steering torque, is calculated using the determined temperature gain and the steering angle gain, a compensation current is calculated according to the calculated torque weight, and a Coulomb friction compensation current is accordingly output (S870).

The EPS device adds the viscous friction compensation current and the Coulomb friction compensation current, which have been calculated through the above-mentioned process, and outputs a friction compensation current (S880).

The EPS control logic 200 adds the output friction compensation current to the current, which is output to drive the motor 400, and supplies the same to the motor 400 such that the torque rise resulting from the frictional force in the low-temperature state can be reduced, thereby guaranteeing that the driver can have the same feeling of steering, even in the low-temperature state, as that in the room-temperature state.

Although the exemplary embodiments of the present invention have been described for illustrative purposes, those skilled in the art will appreciate that various modifications and substitutions are possible, without departing from the scope and spirit of the invention as disclosed in the accompanying claims. Therefore, the exemplary embodiments disclosed in the present invention are intended to illustrate the scope of the technical idea of the present invention, and the scope of the present invention is not limited by the exemplary embodiments.

BRIEF DESCRIPTION OF REFERENCE NUMERALS

100: Low-temperature compensation unit
110: Viscous friction compensation current calculation unit 120: Coulomb friction compensation current calculation unit
130: Compensation current output unit
140: Operating situation sensing unit
200: EPS control logic
300: Current weighting unit
400: motor

What is claimed is:

1. An electronic power steering device comprising a controller configured to:
   determine a viscous gain on the basis of a temperature sensed by a temperature sensor and to calculate a first compensation current using the determined viscous gain and a steering angular velocity; and
   determine a temperature gain on the basis of the sensed temperature, to determine a steering angle gain on the basis of an amount of accumulated steering angles, and to calculate a second compensation current using the temperature gain and the steering angle gain.

2. The electronic power steering device of claim 1, wherein the controller is further configured to determine the viscous gain according to the sensed temperature using a lookup table storing information regarding a relation between a temperature and the viscous gain.

3. The electronic power steering device of claim 2, wherein the viscous gain decreases as the sensed temperature increases.

4. The electronic power steering device of claim 1, wherein the controller is further configured to estimate a damping coefficient on the basis of the sensed temperature and to determine the viscous gain according to the estimated damping coefficient.

5. The electronic power steering device of claim 4, wherein the controller is further configured to estimate the damping coefficient according to the sensed temperature using a lookup table storing information regarding a relation between a temperature and the damping coefficient.

6. The electronic power steering device of claim 5, wherein the damping coefficient decreases as the sensed temperature increases, and the viscous gain increases as the estimated damping coefficient increases.

7. The electronic power steering device of claim 1, wherein the controller is further configured to give a weight to a steering torque using the determined temperature gain and the determined steering angle gain and to calculate a compensation current regarding the given weight as a second compensation current.

8. The electronic power steering device of claim 1, wherein the temperature gain is determined to have a constant value at a preset temperature or less, and the steering angle gain decreases as the amount of accumulated steering angles increases.

9. The electronic power steering device of claim 1, wherein the controller is further configured to output a friction compensation current on the basis of the first compensation current and the second compensation current.

10. The electronic power steering device of claim 1, wherein the controller is further configured to operate only when the sensed temperature is equal to or less than a preset temperature.

11. A method for reducing a torque rise in a low-temperature situation of an electronic power steering device, the method comprising:
   sensing a temperature of a system;
   determining a viscous gain on the basis of the sensed temperature and calculating a first compensation current using the determined viscous gain and a steering angular velocity;
   determining a temperature gain according to the sensed temperature, determining a steering angle gain according to an amount of accumulated steering angles, and calculating a second compensation current using the temperature gain and the steering angle gain; and
   outputting a friction compensation current on the basis of the first compensation current and the second compensation current.

12. The method of claim 11, wherein, in the determining the viscous gain and calculating the first compensation current, the viscous gain is determined according to the sensed temperature using a lookup table storing information regarding a relation between a temperature and the viscous gain.

13. The method of claim 12, wherein the viscous gain decreases as the sensed temperature increases.

14. The method of claim 11, wherein, in the determining the viscous gain and calculating the first compensation current, a damping coefficient is estimated on the basis of the sensed temperature, and the viscous gain is determined according to the estimated damping coefficient.

15. The method of claim 14, wherein, in the determining the viscous gain and calculating the first compensation current, the damping coefficient is estimated according to the sensed temperature using a lookup table storing information regarding a relation between a temperature and the damping coefficient.

16. The method of claim 11, wherein, in the determining the temperature gain, determining the steering angle gain, and calculating the second compensation current, a weight is given to a steering torque using the temperature gain and the steering angle gain, and a compensation current regarding the given weight is calculated as the second compensation current.

17. The method of claim 11, wherein at least one of the determining the viscous gain and calculating the first compensation current and the determining the temperature gain, determining the steering angle gain, and calculating the second compensation current is performed only when the sensed temperature is equal to or less than a preset temperature.

* * * * *